(12) United States Patent
Ducheminsky et al.

(10) Patent No.: US 7,579,844 B2
(45) Date of Patent: Aug. 25, 2009

(54) ROTOR BLADE SYSTEM FOR ROTOR AND ROTOR CASE INSPECTION

(75) Inventors: Kevin M. Ducheminsky, Winnipeg (CA); Kevin C. Beach, San Antonio, TX (US)

(73) Assignee: Standard Aero Limited (CA)

( * ) Notice: Subject to any disclaimer, the term of this patent is extended or adjusted under 35 U.S.C. 154(b) by 194 days.

(21) Appl. No.: 11/716,456

(22) Filed: Mar. 9, 2007

(65) Prior Publication Data
US 2008/0218181 A1    Sep. 11, 2008

(51) Int. Cl.
*G01R 23/20*    (2006.01)
*F01D 5/00*    (2006.01)

(52) U.S. Cl. .......................................... 324/622; 416/61

(58) Field of Classification Search ................. 324/662, 324/661, 658, 649, 600, 402, 378, 326, 512, 324/528, 66; 73/1.79, 116.08, 660, 661, 73/763, 768, 774, 775; 416/61, 62, 37, 143
See application file for complete search history.

(56) References Cited

U.S. PATENT DOCUMENTS

| | | | |
|---|---|---|---|
| 3,802,798 A * | 4/1974 | Hibyan ........................ 416/143 |
| 4,071,820 A | 1/1978 | Mushinsky | |
| 4,333,239 A * | 6/1982 | Arrigoni ........................ 33/535 |
| 4,823,071 A * | 4/1989 | Ding et al. ................... 324/662 |
| 5,140,494 A | 8/1992 | Slade | |
| 5,166,626 A | 11/1992 | Hester et al. | |
| 5,497,101 A | 3/1996 | Fillion | |
| 5,811,691 A * | 9/1998 | Jackson ................... 73/861.65 |
| 6,584,849 B2 * | 7/2003 | Loftus et al. ................. 73/659 |
| 7,086,834 B2 * | 8/2006 | LeMieux ......................... 416/1 |
| 2006/0000283 A1 | 1/2006 | Twerdochlib | |
| 2006/0171806 A1 | 8/2006 | Twerdochlib | |

* cited by examiner

*Primary Examiner*—Timothy J Dole
*Assistant Examiner*—Hoai-an D Nguyen
(74) *Attorney, Agent, or Firm*—McDermott Will & Emery LLP

(57) ABSTRACT

The present invention relates to a system used for inspecting the position of a compressor rotor within a compressor rotor case. A compressor rotor blade is moved about the rotor blade path of the compressor rotor case, a probe holder attached to the rotor blade has a scanning device as part of the holder used for gathering information relative to the compressor rotor case. A fixture attached to the compressor rotor gathers information about the position of the compressor rotor with respect to the compressor rotor case to determine the relative position of both the compressor rotor in relation to the compressor rotor case.

45 Claims, 3 Drawing Sheets

ROTOR BLADE SYSTEM FOR ROTOR AND ROTOR CASE INSPECTION

FIELD OF INVENTION

The present invention relates to an inspection system. More specifically, the invention relates to a rotor blade system for inspecting the position of a compressor rotor in relation to its compressor rotor case.

BACKGROUND OF THE INVENTION

The inspection of a compressor casing is generally conducted by measuring a gap between the tip of rotor blades and the compressor case blade path.

The rotor blades and the blade path of the compressor case are an area of critical concern both in the assembly and the operation of turbine engine technology, in particular gas turbine engine technology used in the aerospace industry. Incorrect positioning of the compressor rotor within its respective compressor case will result in dubious performance parameters leading to blade clearance variations. Accordingly, blade clearance can vary over the operating points of a gas turbine engine including during ground idle, takeoff, cruise or deceleration as well as over the cycle life of the engine. These variations can be due to a number of factors including loads on both static and rotating parts and the wear of these parts. In certain situations excessive blade clearance between the rotor blades and surrounding case can result in reduced engine efficiency. Accordingly, the performance of the gas turbine engine can be adversely affected by having a non-optimal placement of the compressor rotor within its respective compressor case.

A number of systems have been developed in an attempt to optimize compressor rotor placement and reduce blade tip clearance problems found in gas turbine engines. More specifically, off-centre positioning of the compressor rotor will increase the clearance in one area around a circumference of the compressor case but at the same time inadvertently increase the risk of a tip rub situation in opposite areas of the compressor case circumference. Accurately minimizing those blade tip clearances will ensure maximum air-mass flow is directed through the working path and not lost to "blow-by" over the tips.

U.S. Pat. Nos. 6,949,939; 5,497,101; 5,166,626; U.S. Pat. No. 5,140,494; and U.S. Pat. No. 4,071,820 disclose the use of probe members particularly adapted to be inserted and fixed in one or more positions within and around the compressor casing of gas turbine engines. Systems used for determining turbine blade clearance incorporate capacitance tip clearance systems to measure the capacitance between the fixed probe and the blade tip. Some of those systems require the full working of the turbine engine to put into affect their system. In particular, methods applied to position the compressor rotor relative to the compressor case rely on shims used in each quadrant around the compressor case circumference between the blade tips and case. However, in an attempt to optimize compressor rotor performance and subsequently reduce blade tip clearance problems, the accuracy of those systems and methods appear to be compromised by the very nature of the systems and methods used resulting in the aforementioned problems including but not limited to engine lock-up.

In order to overcome the disadvantages of the prior art, the present invention provides a rotor blade system for inspecting and optimizing the performance parameters of rotors used for example, in turbine engines, in particular gas turbine engines used in the aerospace industry.

SUMMARY OF INVENTION

An object of the invention is to provide a rotor blade system having methods, tools in kit form or otherwise and a use thereof for producing information to correctly align a compressor rotor within a compressor case to achieve the benefits of minimized tip clearance and enhanced performance of a compressor rotor within it's respective compressor rotor case. More specifically, the present invention accurately determines performance parameters to optimally align a compressor rotor within a compressor case. In particular, the invention relates to a rotor blade system for inspecting a blade path on the circumference of a compressor rotor casing and for determining, in sequential order or in a synchronized manner, the position of the compressor rotor in relation to the compressor rotor case using wireless, wired or both, a laser probe, capacitance probe or both to scan about a compressor rotor blade path of the compressor rotor case with a rotor positioner having an encoder, transmitter, receiver or combinations thereof. The system uses information gathered about the position of the compressor rotor in relation to information gathered about the compressor rotor case to produce accurate and efficient operational performance parameters.

In an aspect of the present invention there is provided a rotor blade system for inspecting a position of a compressor rotor within a compressor rotor case, the system comprises a probe holder dimensioned for releasable attachment to a rotor blade of said compressor rotor, a first fixture for immobilizing the rotor blade, and a second fixture for operably moving said probe holder and a probe thereof about a rotor blade path of said compressor case.

In a further aspect the present invention provides a method for inspecting a position of a compressor rotor within a compressor rotor case, including the steps of a) releasably securing a first fixture to a compressor rotor blade for immobilizing said rotor blade, b) releasably securing a probe holder and probe thereof to the rotor blade for scanning a rotor case blade path and transmitting collected information thereof, c) establishing a zero-point between said probe and the rotor case, d) releasably attaching a second fixture to a central portion of said compressor rotor case; and e) actuating the second fixture for rotating the compressor rotor at least one revolution about the rotor case blade path.

In a further aspect the present invention provides a probe holder comprising a body dimensioned for releasably securement to a rotor blade thereof, said body further dimensioned for retaining a signal transmitter, a scanning device or both.

In a preferred embodiment of the present invention the probe holder includes a scanning device in the form of a probe which is used for operably scanning the blade path for retrieving and transmitting information about the blade path. The probe is a laser probe, a capacitance probe or both. Preferably the scanning device is a laser probe having a signal transmitter for wireless, wired or both forms of communication to a computer.

In a further preferred embodiment the probe holder is made of a non-scratchable material for preventing damage to a surface of the rotor blade, that material being natural, man-made or both.

A further aspect of the present invention provides a first implement for releasable engagement of the probe holder having a hinged body with an operably actuated proximal handle for effecting a toothed jaw of a distal portion of said body.

A further aspect of the present invention provides a first fixture for immobilizing the compressor rotor blade of the compressor rotor having a hex-bolt operably connected to a cam lock, said hex-bolt actuated with a turn of a hexagonally dimensioned tool for introducing in to a hexagonal receiving aperture of the hex-bolt for operably immobilizing the rotor blade.

An even further aspect of the present invention provides a second fixture for operably moving the probe about a circumference of said rotor blade path having a body, a handle attached therefrom, an elongate member extending centrally from a proximal end of said body to a distal end thereof for complementary engagement with said compressor rotor, said body further comprising a receiver, encoder, transmitter or combinations thereof.

Another aspect of the present invention provides a second implement having a tapered body for setting a pre-determined distance between the probe and the rotor case, said body having distal and proximal ends, said proximal end held by the end user said distal end used for establishing said distance.

A further aspect of the present invention provides a kit for applying implements, fixtures, probe holders and probe thereof with the means for interpretation of the gathered data for example with computer related software like for instance the commercially available AccuScan®.

In a preferred embodiment of the present invention, the inspection kit is used for inspecting a position of a compressor rotor within a compressor rotor case having a probe holder for securing a probe, said holder being dimensioned for releasable attachment to the rotor blade with a first fixture used for immobilizing said rotor blade. In a further embodiment of the present invention, a first fixture has a hex-bolt connected to a cam lock, said hex-bolt being operably actuated with a turn of a hexagonally dimensioned tool for immobilizing the rotor blade, the tool being operably introduced in to a hexagonal receiving aperture of the hex-bolt.

In a further preferred embodiment, the present invention provides a second fixture for releasable attachment to the compressor rotor, compressor rotor case or both for operably moving said probe about said rotor blade path. The second fixture having a body, a handle attached therefrom, an elongate member extending centrally from a proximal end of the body to a distal end for complementary engagement with a portion of the compressor rotor, the second fixture also having an encoder, transmitter, receiver or a combination thereof that are releasably attached thereon or therein or both.

A further embodiment of the present invention provides a first implement of the kit for releasably engaging the probe holder, the first implement having a hinged body with an operably actuated proximal handle for effecting a toothed jaw of a distal portion of the body. A second implement of the kit of the present invention preferably provides for setting a pre-determined distance for establishing a zero-point between the probe and the rotor case, said second implement having an elongate, tapered body for ease of insertion and measurement.

In a preferred embodiment, the present invention provides the probe holder of the inspection kit with a body dimensioned for receiving and transmitting information from said probe holder, probe or both, the body is further dimensioned for receiving the rotor blade of the compressor rotor. In an even further embodiment of the present invention part of the body is made of a non-scratchable manmade or natural material for preventing damage to a surface of the rotor blade, in particular the material would be nylon.

In an aspect of the present invention the inspection kit would use a wired, non-wired or both communication link for transmitting information from a laser probe, a capacitance probe or both. The capacitance probe would be a non-contact probe.

These and other features of the invention will become more apparent from the following description in which reference is made to the appended drawings wherein:

DETAILED DESCRIPTION OF THE INVENTION

Although other applications may be envisioned for inspection systems of compressor rotor cases and the rotor blade path thereof, the application of the present invention is particularly advantageous for accurately determining the position of a compressor rotor within its respective compressor case. Accordingly, without intending to limit the present invention to the embodiments described herein, the invention will be described below in further detail having regard to the system, a method and apparatus applied in the system and in particular the use of specialized equipment for the probe inspection system including features used therein as shown in FIGS. 1 to 7.

Figure 1:
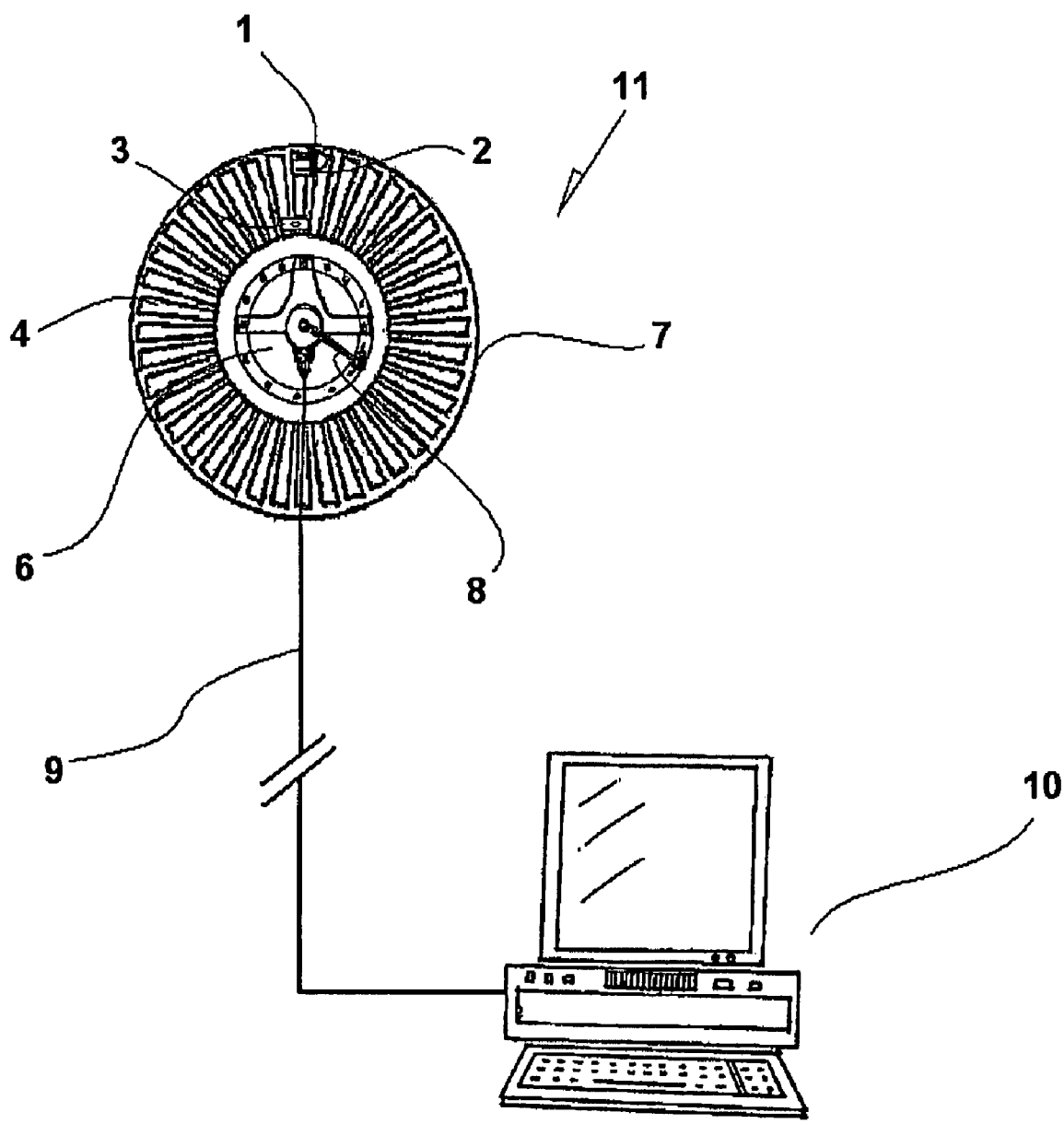
FIG. 1. is a representational view of a rotor blade system.

FIG. 1, shows an embodiment of the present invention providing a rotor blade system. A probe holder 2 has a probe 1, the probe holder 2 is attached to a rotor blade 4 of a compressor rotor 6 using means to secure the probe holder 2 to prevent movement of the probe 1 about the rotor blade 4 when in scanning motion about a blade path (not shown) of a compressor case 7. A probe holder 2 in accordance with a preferred embodiment of the present invention is releasably attached to the rotor blade 4 to secure the probe 1 thereon or therein. The probe holder 2 has apertures 2a for releasable engagement with a fist implement 12 of the probe holder 2 and probe 1 thereof to attach the probe holder 2 to the rotor blade 4, the first implement 12 being operably engaged to releasably attach the probe holder 2 and probe 1 thereof to the rotor blade 4. There is provided a first fixture 3, 3a (Cam lock 3 with Hex-bolt 3a) to immobilize the rotor blade 4, and a second fixture 5 (rotor positioner with an encoder therein) for releasable attachment to a housing of a compressor module 11 for operable movement of said probe 1 about said rotor blade path (not shown) and for determining the relative position of the rotor 6 in relation to the compressor case 7. In accordance with a preferred embodiment of the present invention the second fixture 5 gathers information about the position of the compressor rotor 6 and encodes that information for transmission to the computer and monitor 10 thereof. The probe holder 2, the probe 1 or both can establish in accordance with a preferred embodiment of the present invention a communication link to transmit information from a signal transmitter 1a, the probe 1, the probe holder 2 or a combination thereof to the computer 10, the second fixture 5 or both. In a preferred embodiment the signal transmitter 1a may be linked to or be part of the probe 1, probe holder 2 or both. The transfer of information (not shown) may be in the form of wireless, wired, optical, radio frequency or a combination thereof. The probe 1, according to a preferred embodiment of the present invention, is a laser, capacitance, contact, non-contact probe 1 or a combination thereof. In a preferred embodiment the probe 1 is a laser probe 1. More preferably the probe 1 is a wireless laser probe 1. FIG. 1 further shows the second fixture 5 (rotor positioner with encoder therein) according to an embodiment of the present invention. The second fixture has a handle 8 for operably moving the rotor 6, the first fixture 3,3a, the probe holder 2 and the probe 1 thereof about a circumference of a compressor case 7 of a compressor module 11. The encoder of the rotor positioner 5 has a communication link therein which includes but is not limited to an encoder cable 9 for communicating with the AccuScan® computer software and monitor 10 thereof. The rotor positioner 6 receives, encodes and transmits information about the relative position of the compressor rotor in relation to the compressor rotor case. The rotor positioner 6, in a preferred embodiment of the present invention, includes further means for communicating with the computer 10. The rotor positioner 6 with encoder therein can communicate coded signals to the computer 10 by wireless, wired, infrared, radio frequency or combinations thereof.

Figure 5:
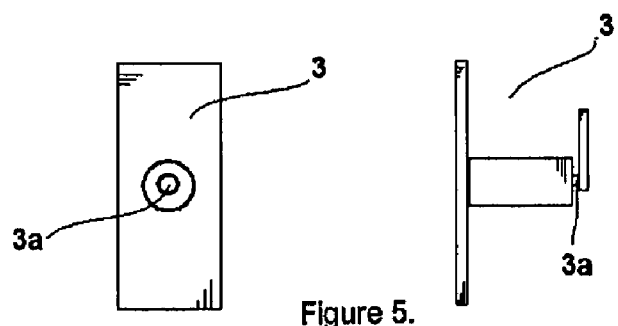
FIG. 5. is a top and side view of the cam lock of the present invention.
Figure 6:
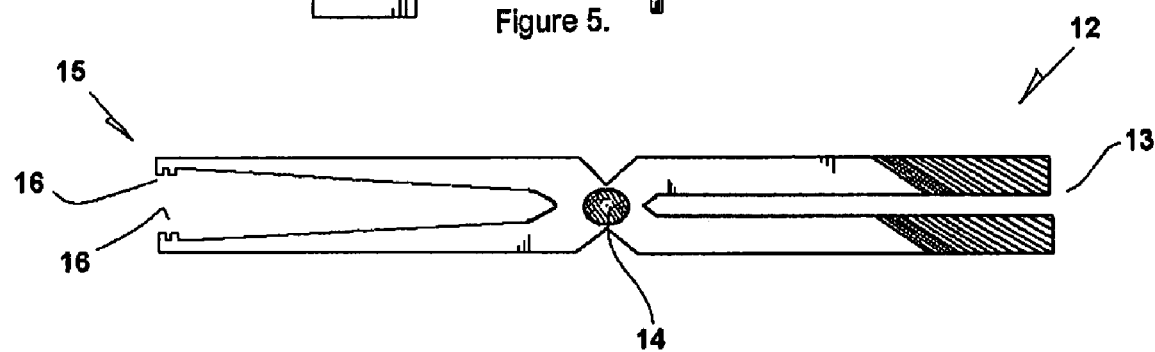
FIG. 6. is a side view of the first implement of the present invention.

Prior to the attachment of the probe 1 or probe holder 2 and probe 1 therein or thereon, the rotor blade 4 is secured and immobilized in accordance with an embodiment of the present invention with the attachment of a first fixture 3, 3a (as shown in FIG. 5) to the rotor blade 4. The cam lock 3 is adjusted about the hex-bolt 3a which is moveably attached therethrough. A hexagonal aperture of the hex-bolt 3a is actuated with a commonly known Allan wrench (not shown) to engage and immobilize a rotor blade 4 to a further rotor blade 4 thereby increasing the rigidity of the rotor blade 4 with the probe 1 thereon and decreasing vibration of those blades to effect an effective and efficient scan of the blade path.

Figure 2:
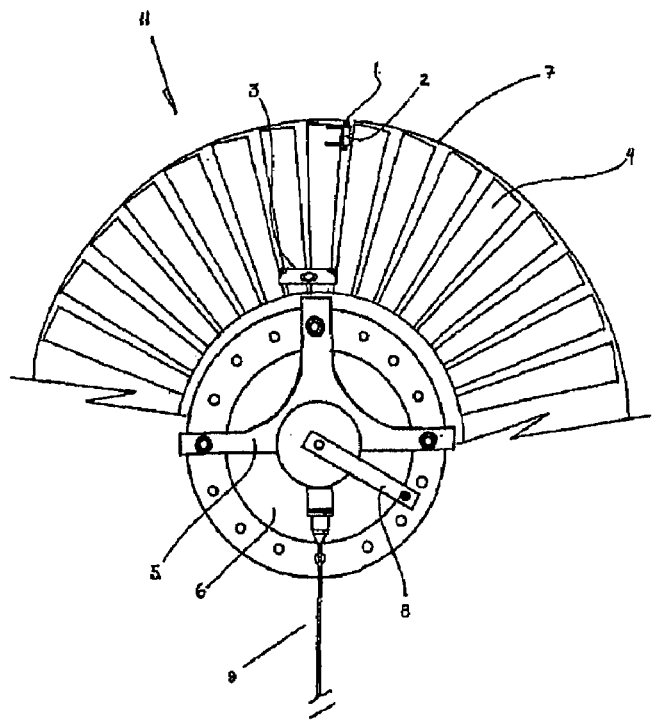
FIG. 2. is a perspective view of embodiments of the rotor blade system of the present invention.
Figure 3:
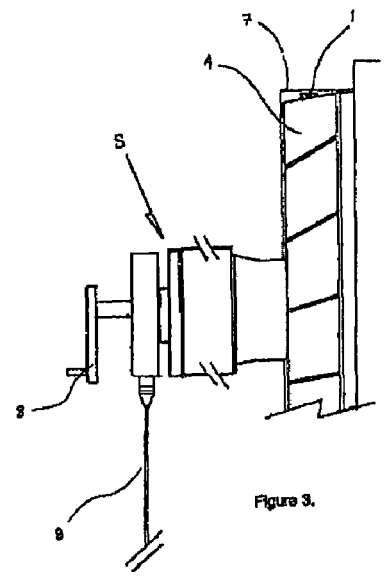
FIG. 3. is a side view of embodiments of the rotor blade system of the present invention.

FIG. 2 and 3 show the rotor positioner 5 with an encoder cable 9 according to a further embodiment of the present invention. FIG. 3, shows the probe 1 in a desired position in relation to the compressor rotor case 7 of the compressor module 11.

Figure 4:
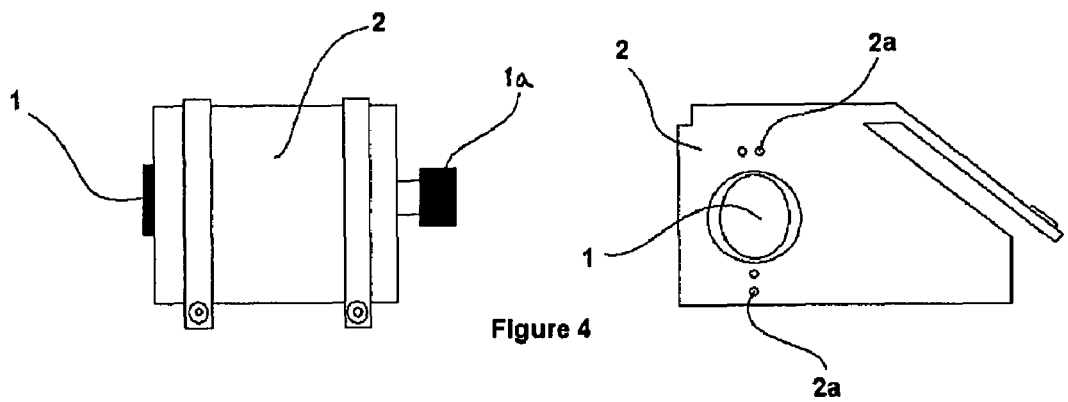
FIG. 4. is a top and side view of the probe holder and probe thereof of the present invention.
Figure 7:
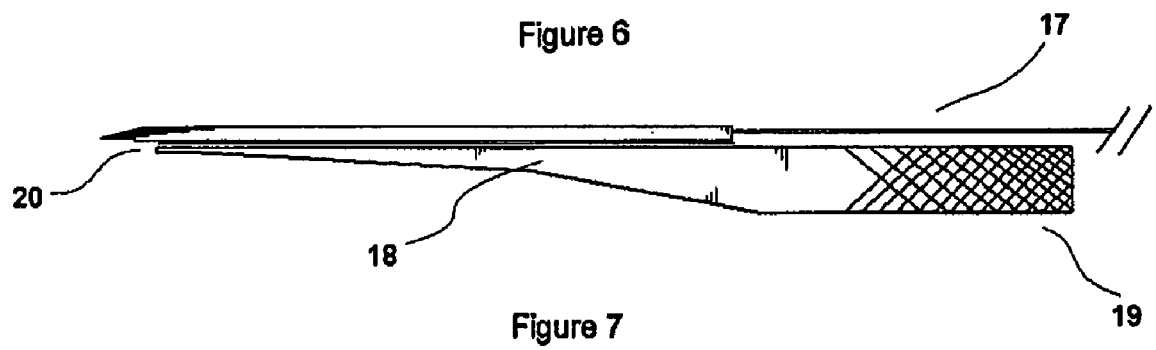
FIG. 7, is a side view of the second implement of the present invention.

FIG. 4, shows the probe holder 2 with probe 1 therein according to an embodiment of the present invention. The probe holder 2 with probe 1 therein is initially engaged with the first implement 12 according to a preferred embodiment of the present invention. The first implement 12 having teeth 15 extending from the distal end 16. The teeth 15 of the first implement 12 operably engage apertures 2a of the probe holder for correct positioning of probe holder 2. Prior to the compressor rotor 6 being engaged, a gap between the compressor rotor case 7 and the probe 1 is set using a second implement 17 in accordance with an embodiment of the present invention. FIG. 7 shows the tapered body 18 of the second implement 17 having a proximal end 19 and a distal end 20. The tapered body 18 is dimensioned for ease of use when pre-setting a zero-point between the probe 1 and the compressor case 7 (may also referred to as the rotor housing).

Embodiments of the present invention provide an inspection system which can be used in various engine types including but not limited to: T56/501, AE2100, AE3007, CF34, PT6, PW100, Vericor's ASE™ models, LM1600, CFM56, TF33, J85; PW2000, JT8D, F100, F110, F404. In particular, the probe inspection system of the present invention can be used for the Rolls Royce T-56, which operates in the C-130 Hercules aircraft. More specifically, the inspection system of the present invention uses the probe 1 and the rotor positioner with encoder 5 as shown in FIGS. 1, 2 and 3 for generating information to aid in aligning the compressor rotor 6 Within its respective compressor case 7. For example, the system of the present invention can be applied to a compressor module 11 as shown in FIGS. 1 to 3.

INDUSTRIAL APPLICABILITY

The rotor blade system of the present invention provides an economical and accurate system for determining crucial parameters of rotor case dimensions of compressor rotors as found in gas turbine engines of a type used in the aerospace industries and elsewhere. Compared to other systems known to those skilled in the art, the present invention accurately determines performance parameters to optimally align a compressor rotor within a compressor rotor case, in a sequential or synchronized way by reducing the number of probes used, by having at least one probe that can include, a contact or non-contact, capacitance probe, laser probe used alone or in the case of the laser probe with for example reflective devices and by applying the unique implements/tools and fixtures of the present invention to effect an economical and accurate rotor blade system. The rotor blade system in kit form of the present invention can be used when applying the kit having the implements, fixtures, probe holders and probe thereof of the present invention accompanied with the means for interpretation of the acquired data, for example with computer related software like for instance the commercially available AccuScan®. In particular, the inspection kit is used for inspecting a position of a compressor rotor within a compressor rotor case having a probe holder for securing a probe, said holder dimensioned for releasable attachment to a rotor blade, a first fixture for immobilizing said rotor blade. The fist fixture having a hex-bolt connected to a cam lock, said hex-bolt being operably actuated with a turn of a hexagonally dimensioned tool for immobilizing the rotor blade, the tool would be operably introduced in to a hexagonal receiving aperture of the hex-bolt. The inspection kit would also have a second fixture for releasable attachment to the compressor rotor, compressor rotor case or both for operably moving said probe about said rotor blade path. The second fixture having a body, a handle attached therefrom, an elongate member extending centrally from a proximal end of the body to a distal end for complementary engagement with a portion of the compressor rotor, the second fixture also having an encoder, transmitter, receiver or a combination thereof that are releasably attached thereon or therein or both.

A first implement of the kit is used for releasably engaging the probe holder, the first implement having a hinged body with an operably actuated proximal handle for effecting a toothed jaw of a distal portion of the body. An inspection kit would also have a second implement for setting a pre-determined distance for establishing a zero-point between the probe and the rotor case, said second implement having an elongate, tapered body for ease of insertion and measurement. The probe holder of the inspection kit also has a body dimensioned for receiving and transmitting information from said probe holder, probe or both, the body is further dimensioned for receiving the rotor blade of the compressor rotor, part of the body is made of a non-scratchable manmade or natural material for preventing damage to a surface of the rotor blade, in particular the material would be nylon. The inspection kit would use a wired, non-wired or both communication link for transmitting information from a laser probe, a capacitance probe or both. The capacitance probe would be a non-contact probe.

The embodiments in which an exclusive property or privilege is claimed are defined as follows:

1. A rotor blade system for inspecting a position of a compressor rotor within a compressor rotor case, the system comprises a probe holder dimensioned for releasable attachment to a rotor blade of said compressor rotor, a first fixture for immobilizing the rotor blade, a second fixture for operably moving said probe holder and a probe thereof about a rotor blade path of said compressor case.

2. A system according to claim 1, wherein said probe holder is for releasable securement to a first stage rotor blade of said compressor rotor.

3. A system according to claim 1, wherein said first fixture is for releasable securement to a forward edge of said rotor blade.

4. A system according to claim 1, wherein said system includes a first implement for effecting releasable attachment of the probe holder to the rotor blade.

5. A system according to claim 1, wherein said system includes a second implement for setting a pre-determined distance between said probe and said rotor case.

6. A system according to claim 1, wherein said probe is a laser probe.

7. A system according to claim 1, wherein said probe is a capacitance probe.

8. A system according to claim 1, wherein a communication link is operably established from said probe holder, said probe or both to a computer used for wireless, wired, optical, radio frequency communication or combinations thereof.

9. A system according to claim 1, wherein said probe, probe holder or both include a wireless transmitter for communicating information to a computer.

10. A system according to claim 1, wherein said second fixture includes an encoder, a receiver, a transmitter or a combination thereof for communicating information to the computer.

11. A system according to claim 10, wherein said second fixture communicates information to the computer about its position relative to the compressor case.

12. A system according to claim 11, wherein said communication is wireless, wired, optical, radio frequency or combinations thereof.

13. A system according to claim 11, wherein said communication link is wired.

14. A system according to claim 1, wherein the system is applied for use in the compressor rotor module of a turbine engine in need of correct positioning of the compressor rotor within the compressor case thereof.

15. A system according to claim 1, wherein said system provides information including optimal placement of the compressor rotor within the compressor case, relative position of the rotor to case blade path, roundness of the blade path, discontinuities at the rotor case split-lines or combinations thereof.

16. A system according to claim 1, wherein the system and information gathered therefrom is used for optimally aligning a compressor rotor within a compressor case of a gas turbine engine of the type selected from a group consisting of T56/501, AE2100, AE3007, CF34, PT6, PW100, Vericor's ASE™, LM1600, CFM56, TF33, J85, PW2000, JT8D, F100, F110, and F404 models.

17. A system according to claim 1, wherein the system is applied for use in a turbine engine module in need of correct positioning of a rotor within a rotor case thereof.

18. A probe holder having a body dimensioned for releasable securement to the rotor blade thereof as defined in claim 1, wherein said body is further dimensioned for including a signal transmitter, a scanning device or both thereof.

19. A probe holder according to claim 18, wherein said scanning device is a probe used for used for scanning a blade path, said probe holder, probe or both used for retrieving and transmitting information about said blade path.

20. A probe holder according to claim 18, wherein said probe operably scans said blade path of a compressor rotor case.

21. A probe holder according to claim 20, wherein said probe is a laser probe, a capacitance probe or both.

22. A probe holder according to claim 18, wherein said signal transmitter transmits information by wired, wireless, optical, radio-frequency communication or combinations thereof.

23. A probe holder according 18, wherein at least part of said body is made of a non-scratchable material for preventing damage to a surface of the rotor blade.

24. A probe holder according to claim 23, wherein said body material is manmade, natural or both.

25. A probe holder according to claim 24, wherein said material is nylon.

26. A first implement for releasable engagement of the probe holder as defined in claim 4, comprising a hinged body with an operably actuated proximal handle for effecting a toothed jaw of a distal portion of said body.

27. A first fixture for immobilizing the compressor rotor blade of the compressor rotor as defined in the system according to claim 1, comprising a hex-bolt operably connected to a cam lock, said hex-bolt actuated with a turn of a hexagonally dimensioned tool for introducing in to a hexagonal receiving aperture of the hex-bolt for operably immobilizing the rotor blade.

28. A second fixture for operably moving the probe about a circumference of said rotor blade path as defined in claim 1, comprising a body, a handle attached therefrom, an elongate member extending centrally from a proximal end of said body to a distal end thereof for complementary engagement with said compressor rotor, said body further comprising a receiver, encoder, transmitter or combinations thereof.

29. A second implement according to the system as defined in claim 5, comprising a tapered body for setting a pre-determined distance between the probe and the rotor case, said body having distal and proximal ends, said proximal end held by the end user said distal end used for establishing said distance.

30. A method for inspecting a position of a compressor rotor within a compressor rotor case, comprising:
 a) releasably securing a first fixture to a compressor rotor blade for immobilizing said rotor blade,
 b) releasably securing a probe holder and probe thereof to the rotor blade for scanning a rotor case blade path and transmitting collected information thereof,
 c) establishing a zero-point between said probe and the rotor case,
 d) releasably attaching a second fixture to a central portion of said compressor rotor case; and
 e) actuating the second fixture for rotating the compressor rotor at least one revolution about the rotor case blade path.

31. A method according to claim 30, whereby said first fixture is used for releasably attaching to a forward edge of said rotor blade, said first fixture having a hex-bolt connected to a cam lock, said hex-bolt operably actuated with a turn of a hexagonally dimensioned tool introduced in to a hexagonal receiving aperture of the hex-bolt.

32. A method according to claim 30, whereby a first implement is actuated for releasable securement of a first stage blade, said first implement having a hinged body with an operably actuated proximal handle for effecting a toothed jaw gripping action of a distal portion of said body.

33. A method according to claim 30, whereby a second implement is operably actuated for setting a pre-determined distance between said probe and said compressor rotor case for establishing a zero-point between said probe and the rotor case, said second implement having an elongate, tapered body for ease of insertion and measurement thereof.

34. A method according to claim 30, whereby said probe is operably moved about a blade path circumference of the compressor rotor case by actuating the second fixture, said second fixture having a body, a handle attached therefrom, an elongate member extending centrally from a proximal end of said body to a distal end for complementary engagement with said compressor rotor, said second fixture having a communication link contained therein.

35. A method according to claim 34, wherein said communication link consists of a receiver, encoder, transmitter or combinations thereof.

36. A method according to claim 30, whereby the operably engaged probe holder and probe thereof scans said rotor case blade path using a laser probe, a capacitance probe or both.

37. A method according to claim 30, whereby the operably engaged probe holder and probe thereof scans the rotor case blade path using a laser probe.

38. A method according to claim 30, whereby a signal is operably communicated from said probe holder or probe thereof to a computer, the second fixture or both by wired, wireless, optical, radio frequency communication or combinations thereof.

39. A method according to claim 30, whereby said transmitted signal is communicated from the probe, probe holder or both to a computer.

40. A method according to claim 30, whereby said transmitted signal is communicated from a wireless probe, wired probe or both to a computer.

41. A method according to claim 30, whereby transferred information from said second fixture and said probe holder and probe thereof is used for correctly positioning the compressor rotor within the compressor rotor case.

42. A method according to claim 41, whereby said information further includes relative position of the rotor to case blade path, roundness of the blade path, discontinuities at the rotor case split-lines or combinations thereof.

43. A method according to claim 30, whereby information transferred between said probe holder or probe therein, said second fixture and the computer is communicated by wired, wireless communication or both.

44. A method according to claim 30, whereby the communicated information is used for optimally aligning the compressor rotor within the compressor case of a gas turbine engine of the type selected from a group consisting of T56/501, AE2100, AE3007, CF34, PT6, PW100, Vericor's ASE™, LM1600, CFM56, TF33, J85, PW2000, JT8D, F100, F110, and F404 models.

45. A method according to claim 30, whereby application of the method is used in a turbine engine module in need of correct positioning of a rotor within a rotor case thereof.

\* \* \* \* \*